(12) United States Patent
Khayat et al.

(10) Patent No.: US 7,855,903 B2
(45) Date of Patent: Dec. 21, 2010

(54) SYSTEM AND METHOD FOR PROGRAMMING AN INTERNAL PARAMETER OR FEATURE IN A POWER CONVERTER WITH A MULTI-FUNCTION CONNECTOR

(75) Inventors: Joseph Maurice Khayat, Bedford, NH (US); Brian Thomas Lynch, Brookline, NH (US); Aditya Makharia, Manchester, NH (US)

(73) Assignee: Texas Instruments Incorporated, Dallas, TX (US)

( * ) Notice: Subject to any disclaimer, the term of this patent is extended or adjusted under 35 U.S.C. 154(b) by 682 days.

(21) Appl. No.: 11/134,957

(22) Filed: May 23, 2005

(65) Prior Publication Data

US 2006/0261678 A1 Nov. 23, 2006

(51) Int. Cl.
*H02H 7/122* (2006.01)
*H01H 47/28* (2006.01)
*G05F 1/00* (2006.01)

(52) U.S. Cl. .................. 363/56.03; 361/187; 323/238; 323/283

(58) Field of Classification Search .................. 363/21, 363/56, 56.03; 361/187; 323/282, 283, 238, 323/321
See application file for complete search history.

(56) References Cited

U.S. PATENT DOCUMENTS

| | | | | |
|---|---|---|---|---|
| 4,401,899 A * | 8/1983 | Okada | ........................ | 327/75 |
| 6,148,398 A * | 11/2000 | Chang et al. | .................. | 713/1 |
| 6,351,398 B1 * | 2/2002 | Balakrishnan et al. | ... | 363/56.03 |
| 6,366,481 B1 * | 4/2002 | Balakrishnan et al. | ... | 363/21.15 |
| 7,209,845 B2 * | 4/2007 | Sutardja | ...................... | 702/65 |
| 7,233,131 B2 * | 6/2007 | Lin et al. | .................... | 323/268 |
| 7,268,593 B1 * | 9/2007 | Doyle et al. | .................. | 327/77 |
| 2004/0059528 A1 * | 3/2004 | Sutardja | ...................... | 702/65 |
| 2006/0244528 A1 * | 11/2006 | Pickerd et al. | .............. | 330/126 |

OTHER PUBLICATIONS

Intersil Data Sheet, Single Synchronous Buck Pulse-Width Modulation Controller, FN90163.3, pp. 1-11, Dec. 28, 2004.*
Intersil Data Sheet, Single Synchronous Buck Pulse-Width Modulation (PWM) Controller, FN9016.3, pp. 1-11, Dec. 28, 2004.*
Fairchild Semiconductor FAN6520A, Single Synchronous Buck PWM Controller, www.fairchildsemi.com. pp. 1-15 Aug. 26, 2004.

* cited by examiner

*Primary Examiner*—Albert DeCady
*Assistant Examiner*—Darrin Dunn
(74) *Attorney, Agent, or Firm*—John J. Patti; Wade J. Brady, III; Frederick J. Telecky, Jr.

(57) ABSTRACT

A programmable parameter or feature is provided for a power converter through a multi-function connection on the converter controller. The parameter or feature selection is active for programming during a startup mode, and the connection is used for other control purposes during a steady state run mode. A reference signal is read on the multifunction connection during startup mode and a selection of a parameter value or feature is made based on a value of the reference signal. The reference signal is compared to preset, internal reference values to select a desired parameter value or feature. An internal preset value is chosen based on the selection and the programming circuitry is disconnected from the connection to permit alternate functionality for the connection. The programmable circuit permits selection from a variety of parameter values or features based on an external signal, without dedicating an external pin on the controller.

13 Claims, 3 Drawing Sheets

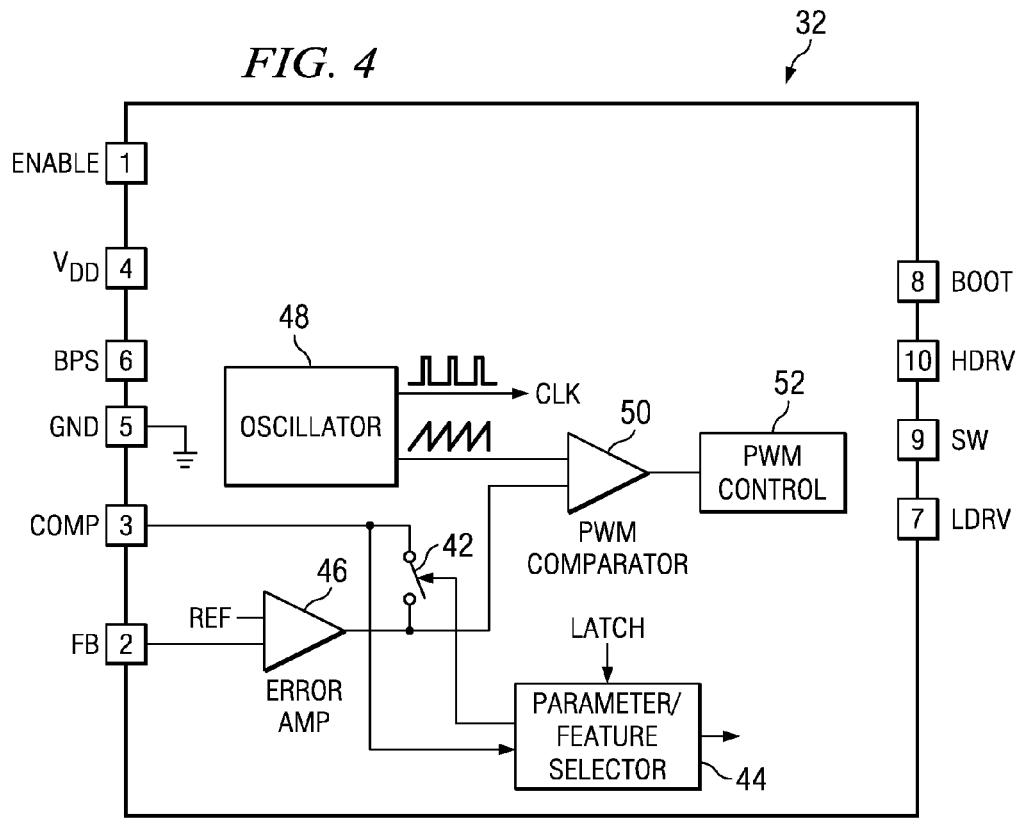
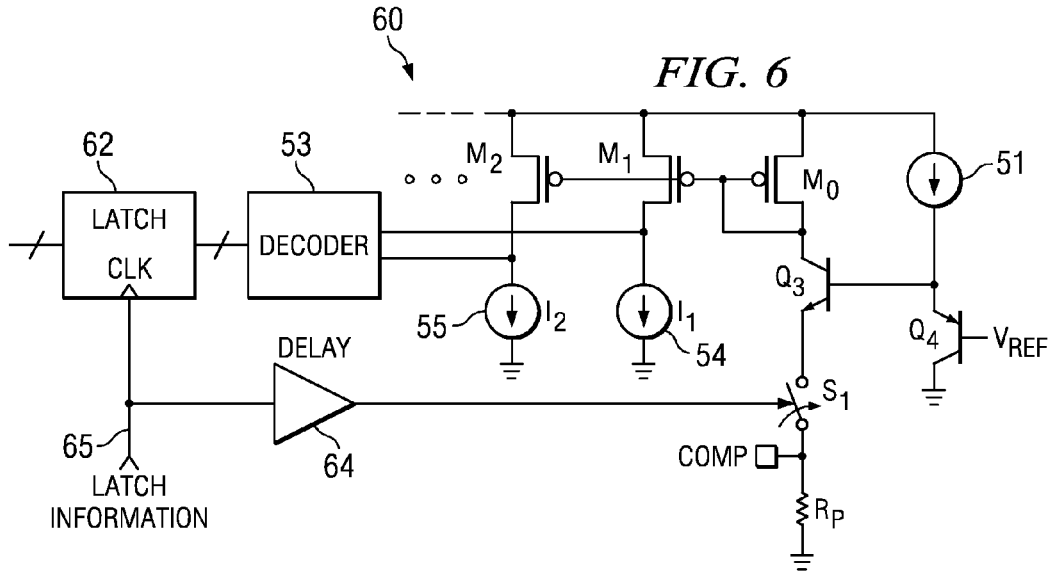

SYSTEM AND METHOD FOR PROGRAMMING AN INTERNAL PARAMETER OR FEATURE IN A POWER CONVERTER WITH A MULTI-FUNCTION CONNECTOR

CROSS REFERENCE TO RELATED APPLICATIONS

N/A

STATEMENT REGARDING FEDERALLY SPONSORED RESEARCH OR DEVELOPMENT

N/A

BACKGROUND OF THE INVENTION

1. Field of the Invention

The present invention relates generally to a system and method for selecting an internal parameter value or feature in a power converter, and relates more specifically to selecting an internal parameter value or feature by comparing a programmable reference signal on a multifunction pin to one or more threshold levels.

2. Description of Related Art

Power converters have become more flexible in providing functionality and features in recent years. One reason for advances in power converters is the design flexibility permitted by digital/analog hybrid controllers. These controllers can measure analog signals and perform digital logic and control functions to provide a wide range of features and functionality in realizing a power converter control.

Among the various parameters that influence power converter control is overcurrent detection and response. A popular technique for detecting and responding to an overcurrent condition involves the use of a current limit threshold, where an overcurrent event causes a power controller to register a current related parameter going beyond a threshold. Due to the importance of providing flexibility in setting an overcurrent threshold level, a dedicated pin or connection for the power controller is typically used. A power converter designer typically specifies a passive component for connection to the dedicated pin to achieve an overcurrent threshold setting for the power converter. Typically, the passive component is a resistor that sets or selects a current threshold level that can be compared against a value representative of current flowing through a power stage of the power converter.

If an external component and dedicated pin are not used to set, or program, the overcurrent threshold limit, an internal overcurrent threshold limit is used, which is typically not programmable. Accordingly, flexibility in the design of the power converter is limited. While it is possible to select from multiple controller models that offer various internal overcurrent thresholds, such a power converter design can be inefficient and costly in practice.

It would be desirable to provide a means for permitting a user to select an internal parameter value, in this example an overcurrent threshold, using one controller design, without having to dedicate a controller connection for that purpose.

BRIEF SUMMARY OF THE INVENTION

In accordance with the present invention, there is provided a system and method for selecting one of several internal parameters, or programming one of several features in a power converter by utilizing one of its connectors as a multifunction connector. The system and method permits the elimination of a dedicated connector for the purpose of setting parameter values or selecting features. There are numerous types of parameters and features in a power converter that are advantageously set or programmed by a user. The list includes, and is not limited to, frequency, output voltage level, soft start time, overcurrent protection level, methods for output voltage sequencing and method of fault protection, for example. The present invention describes an exemplary embodiment in detail, where the system and method is directed to setting an overcurrent threshold level by selecting one from a plurality based on a programming reference signal.

According to an aspect of the present invention, there is provided a system and method for permitting a user to select an internal parameter, such as overcurrent threshold limit, in a power controller. A multifunction pin or connection in a controller is used during one interval to set one of several internal overcurrent threshold limits, and is used for other purposes during other intervals or modes. The connection can be provided with a tri-state gate to permit the secondary function to be disconnected while an overcurrent threshold limit is programmed or set.

In one embodiment, an error amplifier output pin is multiplexed with an overcurrent threshold limit function. During an initial startup, the error amplifier output is disconnected from its pin. A resistor is connected between the pin and a common reference. The resistor does not interfere with the error amplifier during normal operation, and serves the purpose of programming the overcurrent threshold limit during startup. An internal voltage source applied to the resistor permits a sensed current to be obtained. The sensed current is compared internally to one of several preset current levels. The result of the comparison is then decoded, latched, and used to select one of several internally preset overcurrent thresholds. The overcurrent threshold limit is modified, or programmed by adjusting the value of the external resistor.

In accordance with another aspect of the present invention, a sensed current value is obtained from an external resistor during startup for a controller and decoded to select a preset overcurrent threshold limit. The current is decoded by comparison with a number of internal preset current values when a startup sequence in the controller is activated. If the sensed current is greater than a given preset current value, the preset value selects a given overcurrent threshold limit and latches that value for use in the controller during normal operating periods.

In accordance with another aspect of the present invention, a sensed current is provided to the controller on a temporary basis during a startup sequence, and is maintained over a short delay period while a preset overcurrent threshold limit is latched. In this embodiment, the overcurrent threshold limit setup may be permitted for a short time, and the delay and latching elements contribute to ensuring an overcurrent threshold limit is set.

In accordance with another aspect of the present invention, a method for selecting an operating parameter for a power controller, such as an overcurrent threshold limit, for example, is provided without the use of a dedicated connection to a controller. During startup mode, the method provides for sensing a reference signal, such as a current applied to the multi-function connection, for example. The method may include selecting a preset value for the operating parameter, such as an overcurrent threshold limit, for example, based on the sensed reference signal. The preset value selected may be taken from a plurality of presets based on the reference signal, such as a sensed current. The sensed current may be provided in relation to a passive component or network of components coupled to the multi-function connection.

In accordance with another aspect of the present invention, a plurality of overcurrent threshold limits are provided internally to a controller that are selectable through an appropriate choice of a passive component or network coupled to the controller. In at least one instance, one of the plurality of preset overcurrent threshold limits can be selected when no external passive component is provided to the multi-function connection, that is, the connection is left open. Accordingly, an overcurrent threshold limit is automatically selected even if no programming passive component is present. The overcurrent threshold may also be programmed through a network of passive components coupled to the multi-function connection.

In accordance with another aspect of the invention, an impedance coupled to the multifunction connector provides a reference voltage signal upon application of a reference current. The derived reference voltage signal is used to select an internal parameter value or feature. A voltage selection circuit compares the reference voltage signal against one or more thresholds, and selects a parameter value or programmed feature based on a result of the comparison. A decoder circuit and/or latch may optionally be used to indicate the selection and maintain the indication or selection.

Additionally, the concept of selecting one of several internal overcurrent thresholds, without having to dedicate a controller connection for that purpose, applies to other desirable functions or parameters, for example, operating frequency.

BRIEF DESCRIPTION OF THE SEVERAL VIEWS OF THE DRAWINGS

The invention will be more fully understood by reference to the following detailed description of the invention in conjunction with the drawings of which:

FIG. 4 is a block diagram illustrating an example configuration for the integrate circuit of FIG. 3;

FIG. 6 is a circuit diagram illustrating an example of at least a portion of the selector of FIG. 4;

DETAILED DESCRIPTION OF THE INVENTION

Figure 1:
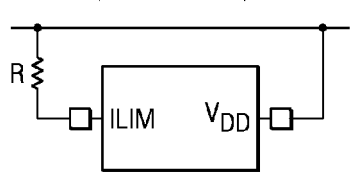
FIG. 1 is an abstract circuit diagram of a conventional overcurrent threshold limit program circuit.

Refer now to the drawings wherein depicted elements are, for the sake of clarity, not necessarily shown to scale and wherein like or similar elements are designated by the same reference numeral through the several views.

Figure 2:
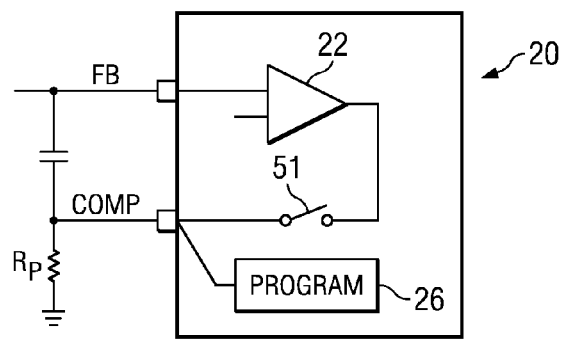
FIG. 2 is a simplified circuit diagram of a programmable overcurrent threshold limit in accordance with an embodiment of the present invention.

Referring now to FIG. 2, a simplified diagram for a parameter value selection circuit is illustrated generally as diagram 20. The circuit of diagram 20 can be used to select an overcurrent threshold limit from among a number of preset values, for example. A resistor Rp is connected to an error amplifier circuit that includes an amplifier 22. A switch 24 disconnects error amplifier 22 during certain stages of operation of the circuit in diagram 20. For example, in a startup mode, switch 24 is open so that no error amplification is used when the switching stage is off. Because switch 24 disconnects amplifier 22 from external circuitry, resistor Rp can be used to program a current sensing circuit which decodes and selects one of several overcurrent threshold limits, for example. During normal running mode, switch 24 is closed so that amplifier 22 can provide a control feedback signal for the controller. In this situation, resistor Rp acts as a small load on the error amplifier circuit. Circuit 26 for selecting a parameter value is disconnected from pin COMP after startup mode is complete, and a parameter value selection has been established.

Figure 3:
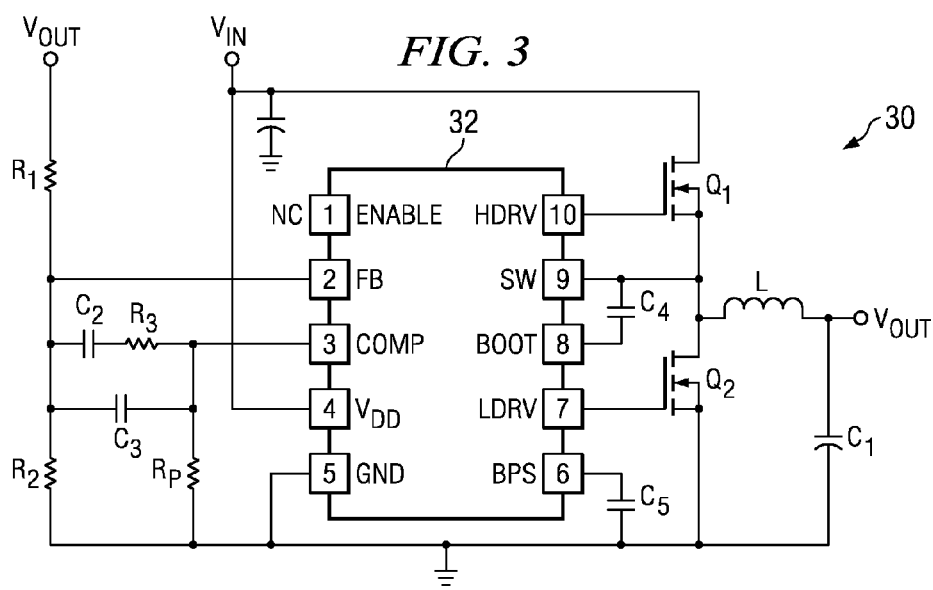
FIG. 3 is a circuit diagram of a DC-DC buck converter or power converter in accordance with an embodiment the present invention.

Referring now to FIG. 3, reference numeral 30 generally designates a DC-DC buck converter. A controller or IC 32 provides synchronous control operation to drive a half bridge that is generally comprised of two FETs Q1 and Q2 (which are preferably NMOS FETs) coupled to on another at a switching node (which is also coupled to pin SW). FET Q1 receives an input voltage VIN Coupled to the output node is an RC network at its drain, and FET Q2 is coupled to ground at its source. Additionally, an inductor L is coupled to the switching node, and capacitor C1 is coupled between inductor L (at the output node) and ground. An output feedback signal from an output voltage VOUT is provided from the output node to an RC network (which is generally comprised of resistors R1, R2, R3 and Rp and capacitors C2 and C3) A feedback signal can then be provided to IC 32 at pin FB for feedback control. Pin COMP provides a compensation for pin FB, with an internal amplifier relating the two connections together. Preferably, controller 32 provides overcurrent or short circuit protection through the selection of one of several internal overcurrent thresholds determined by sensing the impedance of an external passive component, such as resistor Rp, connected from pin COMP to ground, for example. During startup, controller 32 can force a voltage on pin COMP, can measure the current flowing through the impedance on connection COMP, can compare the measured current to several internal current values, and can assert one comparison level to select and latch one of the several internal overcurrent threshold levels. Preferably, three internal overcurrent thresholds are provided. It should be apparent that controller 32 may easily be configured to force a current on pin COMP and to compare the measure voltage against internal values to determine a parameter value selection. It should also be apparent that any number of threshold set points may be used, by simply decoding a greater number of current values.

Referring now to FIG. 4, an internal block diagram showing at least a portion of an example of IC 32 is illustrated. Pin COMP is shown in FIG. 4 as having a switch 42 used to couple and de-couple pin COMP and the output of the error amplifier 46 and a parameter value selector 44. Selector 44 provides the circuitry for reading the current or voltage determined by the passive component(s) on pin COMP and selecting a parameter value from several available values, which is latched into the control illustrated in FIG. 4.

Preferably, switch 42 is deactuated or open during a startup mode or first stage of operation, to connect pin COMP to selector 44 and to de-couple the output of error amplifier 46 from pin COMP. Once the startup mode passes, and the IC 32 enters a normal running mode or second stage of operation, switch 42 is closed or actuated to complete the error loop between pins FB and COMP. The latched value of the parameter, such as, for example, an overcurrent threshold, is then used for comparison against output current values to determine when an overcurrent condition occurs. By providing a selectable overcurrent threshold, for example, IC 32 provides a control that is usable with a number of different applications in a wide variety of power levels. As indicted in selector 44, other parameters that can be given a selectable value include oscillator frequency, soft-start time, output voltage level, an output sequencing method, and fault protection or response methods.

Figure 5:
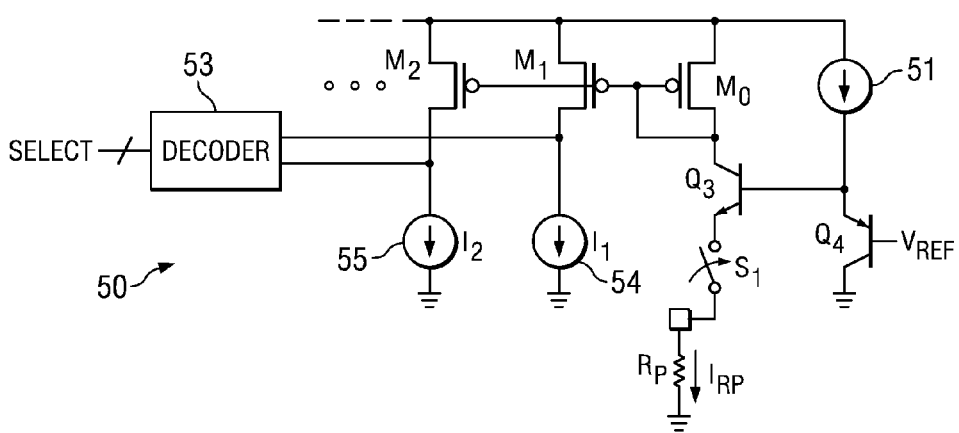
FIG. 5 is a circuit diagram illustrating an example of at least a portion of the selector of FIG. 4.

Referring now to FIG. 5, reference numeral 50 generally designates an example of a schematic diagram of a portion of selector 44. Circuit 50 provides a technique for selecting a parameter value based on voltage provided to resistor Rp. Preferably, circuit 50 is generally comprised of a comparison circuit and a decoder 53. As shown, the comparison circuit includes three branches, but can include more. The first branch or comparison branch is generally comprised of current source 51, and transistors Q3, Q4 and M0. The second branch or comparison branch is generally comprised of transistor M1 and current source 55, and the third branch or comparison branch is generally comprised of transistor M2 and current source 55.

When switch S1 is closed, a reference voltage VREF is provided to transistor Q4, and together with transistors M0 and Q3 can generate a current IRp in resistor Rp. This resulting current or external current IRp flowing through resistor Rp and transistors 51 and M0 is compared against currents I1 and I2, provided through transistors M1 and M2, respectively. Currents I1 and I2 have different values, with current I2 being greater than I1, for example. Any number of comparative currents may be used, where each of the successive currents is higher than the previous, that is, a current I3 would be higher than current I2 and so on.

During programming, switch S1 is closed to determine the current through resistor Rp. Current IRp is compared to the preset internal currents I1 and I2. A decoder 53 determines when a given current path is active, to provide a selection for the parameter value or feature. As shown, circuit 50 transistor M0 is diode-connected and transistors M1 and M1 are coupled to the gate of transistor M0 at their respective gates in current mirror configurations, which allows circuit 50 to provide a current mirror for current IRp that activates one or more internal current paths depending upon the value of current IRp. That is, if current IRp is greater than or equal to current path I1, and less than current path I2, then an active current path I1 is decoded in decoder 53. If IRp is greater than or equal to current I2, then current path for current I2 is decoded as an active current in decoder 53. Any current path that is not active because the value of current IRp is not great enough to make the path active, is decoded as an inactive path in decoder 53. Accordingly, if current IRp is lower than the lowest value for the current paths for currents I1 and I2, a selection is still made based on currents I1 and I2 both being inactive.

Referring now to FIG. 6, reference numeral 60 generally designates an example of a schematic diagram of a portion of selector 44. Circuit 60 is similar in concept and function to circuit 50, and further includes a latch 62 and a delay element 64. The additional circuitry in circuit 60 provides a particular timing sequence for latching the parameter value or feature information before resistor Rp is disconnected with switch S1. A latch signal 65 is provided at a clock input of latch 62 to secure the decoded parameter value or feature information. Latch signal 65 also propagates through delay element 64 to open switch S1 after a given delay. When switch S1 is open, pin COMP is disconnected from selector 44. In accordance with the configuration of circuit 60, the feature or parameter value, such as, for example, an overcurrent limit threshold value, is latched in latch 62 prior to the opening of switch S1, to ensure a good reading of the parameter value or feature selection information is obtained.

Figure 7:
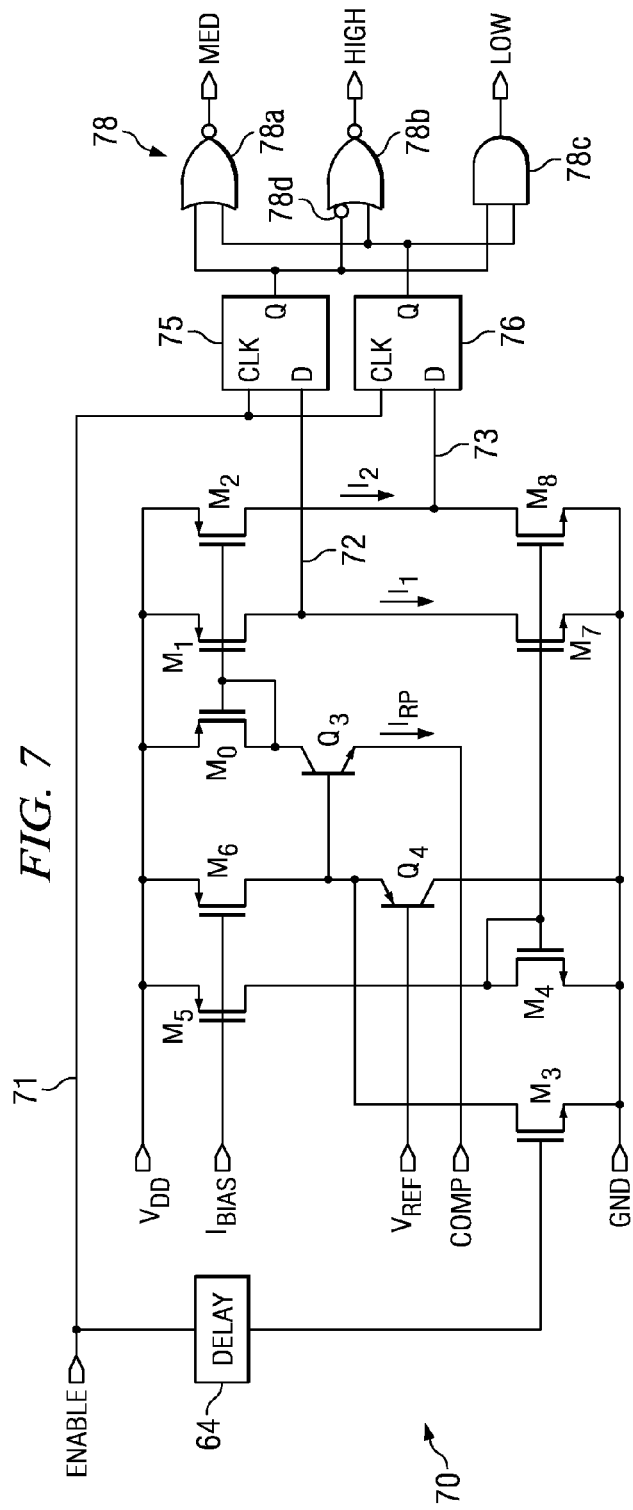
FIG. 7 is a circuit diagram illustrating an example of at least a portion of the selector of FIG. 4.

Referring now to FIG. 7, reference numeral 70 generally designates an example of a schematic diagram of a portion of selector 44. Circuit 70 is generally comprised of transistors Q3, Q4 and M0 through M8, delay 64, flip-flops 75 and 76, and combinational logic 78. Combinational logic 78 is generally comprised of NOR gates 78a and 78b, inverter 78d, and AND gate 78c.

In operation during a startup period (for exampled), transistor M3 (which generally operates as switch S1 of FIGS. 2 and 4-6) is actuated. A current IRp is drawn through pin COMP, and a reference voltage VREF is provided to transistor Q4. A bias current IBIAS is also provided to transistors M5 and M6. This bias current allows current mirrors (generally comprised of diode-connected transistor M4 and transistors M7 and M8) to generate currents I1 and I2 on the second and third comparison branches. Current IRp can then be compared against currents I1 and I2. If current IRp is less than current I1 or I2, signal lines 72 and 73 both remain at a low logic level. D flip flops 75 and 76 produce outputs that are decoded by combinational logic 78 to produce the set point levels for the selected parameter value. In the example illustrated in circuit 70, an overcurrent limit threshold is selected based on three available levels. For example, NOR gate 78a decodes two low levels from D flops 75 and 76 to select a medium level for an overcurrent threshold. This selection level corresponds to high impedance value at pin COMP, such as in the case of no programming component being connected at all.

If current IRp is equal to or greater than current I1, and less than current I2, signal line 72 becomes a logic high level, while signal line 73 remains a logic low level. The resulting selection at combinational logic 78 outputs a logic high signal from NOR gate 78b to select a high range of preset current limits. If current IRp is greater than both current I1 and I2, both signal lines 72 and 73 become logic high. The resulting overcurrent threshold limit selection in combinational logic 78 results in AND gate 78c outputting a logic high signal to select a low overcurrent threshold limit. Lines 72 and 73 selected during startup with the impedance coupled to pin COMP are latched in D flip flops 75 and 76 with a clock signal that is provided as an enable signal 71. Signal 71 is active during a startup mode to latch the lines 72 and 73 into D flip flops 75 and 76. After startup mode, signal 71 remains low and the latched values in D flip flops 75 and 76 continue to select the programmed overcurrent threshold limit determined through logic gates 78.

Figure 8:
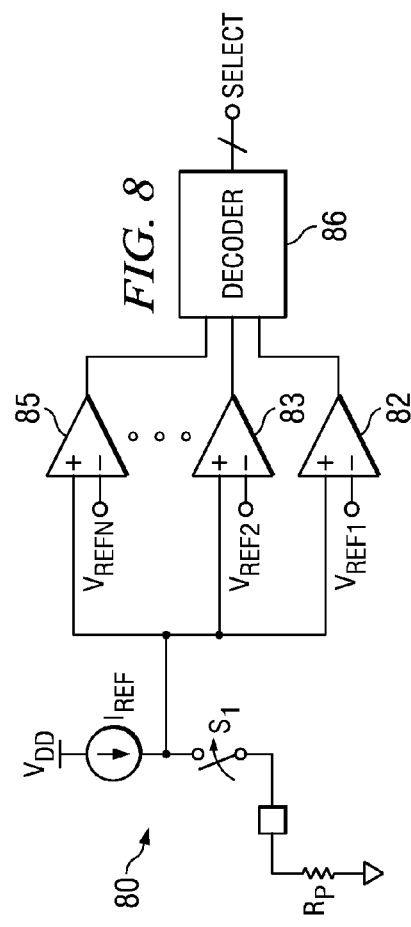
FIG. 8 is a circuit diagram illustrating an example of at least a portion of the selector of FIG. 4.

Referring to FIG. 8, reference numeral 80 generally designates an example of a schematic diagram of a portion of selector 44. Circuit 80 operates on a voltage reference basis to determine which parameter value or feature should be selected based on the value of resistor Rp. A current Iref, coupled to switch 51 is forced on resistor Rp when switch 51 is closed during startup. The resulting voltage across resistor Rp is supplied to comparators 82, 83, and 85, as well as any other comparators represented by dashed lines in circuit 80. It should be noted that a selection according to this technique may be made using a single comparator, and additional comparators permit additional selection decisions.

Comparators 82-85 provide a comparison result based a respective comparison of voltage references Vref1-VrefN to the input voltage across resistor Rp. A decoder 86 manipulates the results to provide an indication of the selected parameter or feature. Preferably, voltage references Vref1-VrefN have different values, so that their respective comparator outputs indicate a digitized value of the voltage across resistor Rp. That is, comparators 82-85 act as an analog-to-digital converter (ADC) for selection of a desired parameter value. Decoder 86 assesses the active lines of comparators 82-85 and provides a selection based on the assessment. Other exemplary embodiments include a direct selection of a parameter through activation of a given comparator output or set of outputs, for example.

Although not shown in FIG. 8, a latch may also be used store a selection indication or to store a selected parameter value or feature. The operation of the latch could be similar to that of the D-flip flops shown in FIG. 7, for example.

The circuit for selecting the overcurrent threshold limit operates as follows. An error amplifier output is initially tri-stated to disconnect it from its other functionality. An external impedance connected between the tri-stated connection and ground connection receives an arbitrary supply voltage from the connection to develop a current that can be measured in the controller. The current through the impedance is measured or sensed and compared to one or more internal levels. As the comparison to the internal levels is made, a decision is made for selection of one of the internal preset levels based on the current supply to the external component. Once the decision is made, the error amplifier output is reconnected using the tri-state gate.

The above series of operations can be provided through an internal sequencer to obtain good overcurrent threshold data in a very short time period. For example, threshold data may be acquired in approximately one millisecond, which includes sensing the current supplied to the external impedance and deciding on which preset overcurrent threshold limit to select. Once the internal sequence is completed, the controller can move on to a normal start sequence and normal operation, for example.

In accordance with an embodiment of the present invention, a connection to a power controller is used to drive an external impedance to obtain a programmable selection for an overcurrent threshold limit. The choice of controller connection can vary, and is made according to an exemplary embodiment to incorporate an amplifier or driver that is operable to provide a current to an external component or network. Accordingly, the tri-stated functionality need not be an error amplifier, but can be any function that has a free operating range available for use for other functionality in a multipurpose connection.

The present invention is not limited to overcurrent threshold limit detection and setting, but can be used with any type of control function where a programmable set point is desired without the use of a dedicated external connection. One example of an internal programmable function is the operating frequency of the controller. Another example would be selection of several soft start timing ranges.

Having thus described the present invention by reference to certain of its preferred embodiments, it is noted that the embodiments disclosed are illustrative rather than limiting in nature and that a wide range of variations, modifications, changes, and substitutions are contemplated in the foregoing disclosure and, in some instances, some features of the present invention may be employed without a corresponding use of the other features. Accordingly, it is appropriate that the appended claims be construed broadly and in a manner consistent with the scope of the invention.

What is claimed is:

1. A power converter device, comprising:
  a first pin;
  a second pin;
  an error amplifier having an input and an output, wherein the input of the error amplifier is coupled to the first pin;
  a switch that is coupled to the second pin and the output of the error amplifier, that is operable to de-couple the second pin from the output of the error amplifier during a first stage of operation, and that is operable to couple the second pin to the output of the error amplifier during a second stage of operation;
  a comparison circuit that is coupled to the switch so as to compare an external current to a plurality of reference currents from a plurality of current sources during the second stage of operation, wherein the comparison circuit includes a current minor circuit that is coupled to each of the current sources; and
  a decoder that is operable to select a parameter during the first stage of operation as a function of a determined reference signal, wherein the decode includes:
    a plurality of flip-flops that are each coupled to at least one of the portions of the comparison circuit; and
    combinational logic that is coupled to each of the flip-flops.

2. The power converter of claim 1, wherein the combinational logic further comprises a plurality of logic gate, wherein each logic gate is coupled to at least one flip-flop.

3. The power converter of claim 1, wherein the comparison circuit further comprises:
  a first branch that is coupled to the switch, wherein the second branch includes a first transistor that is diode-connected; and
  a second branch that is coupled to at least one of the flip-flops, wherein the second branch includes:
    a second transistor having a control electrode that is coupled to the control electrode of the first transistor; and
    a first current source of the plurality of current sources having a first reference current that is coupled to the second transistor; and
  a third branch that is coupled to at least one of the flip-flops, wherein the third branch includes:
    a third transistor having a control electrode that is coupled to the control electrode of the first transistor; and
    a second current source of the plurality of current sources having a second reference current that is coupled to the third transistor, wherein the magnitude of the first reference current is different from the magnitude of the second reference current.

4. The power converter of claim 1, wherein the power converter further comprises:
  an oscillator;
  a comparator that is coupled to the output of the error amplifier and to the oscillator; and
  a pulse width modulation (PWM) control that is coupled to the comparator.

5. The power converter of claim 1, wherein the power converter further comprises a latch that is coupled to the decoder.

6. An integrated circuit (IC) comprising:
  a first pin;
  a second pin;
  an error amplifier having an input and an output, wherein the input of the error amplifier is coupled to the first pin;
  a switch that is coupled between the second pin and the output of the error amplifier; and
  a selector that is coupled to the switch and that is adapted to actuate the switch to program the IC based at least in part on an external current, wherein the selector includes:
    a first comparison branch including:
      a first transistor that is diode-connected; and
      a second transistor that is coupled between first transistor and the switch;

a second comparison branch including:
  a third transistor having a control electrode that is coupled to the control electrode of the first transistor; and
  a first current source having a first reference current that is coupled to the third transistor; and
a third comparison branch including:
  a fourth transistor having a control electrode that is coupled to the control electrode of the first transistor;
  a second current source having a second reference current that is coupled to the fourth transistor, wherein the magnitude of the first reference current is different from the magnitude of the second reference current; and
a decoder that selects a parameter based at least in part on the comparison of the external current to the first and second reference currents so as to program the apparatus, wherein the decoder includes:
  a first flip-flop that is coupled to the second comparison branch;
  a second flip-flop that is coupled to the third comparison branch; and
  combinational logic that is coupled to the first and second flip-flops.

7. The IC of claim 6, wherein the combinational logic further comprises:
  a first NOR gate that is coupled to the first and second flip-flops;
  an inverter that is coupled to the first flip-flop;
  a second NOR gate that is coupled to the inverter and to the second flip-flop; and
  an AND gate that is coupled to the first and second flip-flops.

8. The IC of claim 6, wherein the first and second flip-flops are D flips-flops.

9. The IC of claim 6, wherein the IC further comprises a latch that is coupled to the decoder.

10. An apparatus comprising:
  an IC having a first pin, a second pin, a third pin, and a fourth pin, wherein the IC includes:
    an error amplifier having an input and an output, wherein the input of the error amplifier is coupled to the first pin;
    a switch that is coupled between the second pin and the output of the error amplifier; and
    a selector that is coupled to the switch and that is adapted to actuate the switch to program the IC based at least in part on an external current, wherein the selector includes:
      a first comparison branch including:
        a first transistor that is diode-connected; and
        a second transistor that is coupled between first transistor and the second pin;
      a second comparison branch including:
        a third transistor having a control electrode that is coupled to the control electrode of the first transistor; and
        a first current source having a first reference current that is coupled to the third transistor; and
      a third comparison branch including:
        a fourth transistor having a control electrode that is coupled to the control electrode of the first transistor;
        a second current source having a second reference current that is coupled to the fourth transistor, wherein the magnitude of the first reference current is different from the magnitude of the second reference current; and
      a decoder that selects a parameter based at least in part on the comparison of the external current to the first and second reference currents so as to program the apparatus, wherein the decoder includes:
        a first flip-flop that is coupled to the second comparison branch;
        a second flip-flop that is coupled to the third comparison branch; and
        combinational logic that is coupled to the first and second flip-flops;
    a fifth transistor that is coupled to the third pin at its control electrode and that is coupled to a node at one of its passive electrodes;
    a sixth transistor that is coupled to the fourth pin at its control electrode and that is coupled to the node at one of its passive electrodes;
    an inductor that is coupled to the node;
    a capacitor that is coupled between the inductor and ground; and
    a resistor that is coupled between the second pin and ground.

11. The apparatus of claim 10, wherein the combinational logic further comprises:
  a first NOR gate that is coupled to the first and second flip-flops;
  an inverter that is coupled to the first flip-flop;
  a second NOR gate that is coupled to the inverter and to the second flip-flop; and
  an AND gate that is coupled to the first and second flip-flops.

12. The apparatus of claim 10, wherein the first and second flip-flops are D flips-flops.

13. The apparatus of claim 10, wherein the IC further comprises a latch that is coupled to the decoder.

* * * * *